United States Patent
Zahn et al.

(10) Patent No.: US 9,811,797 B2
(45) Date of Patent: Nov. 7, 2017

(54) TRANSPORTATION CONNECTION CACHE FOR DYNAMIC NETWORK AND ROUTE DETERMINATION

(71) Applicants: Marcus Zahn, Neulussheim (DE); Holger Huene, Heidelberg (DE); Jens Gottlieb, Plankstadt (DE)

(72) Inventors: Marcus Zahn, Neulussheim (DE); Holger Huene, Heidelberg (DE); Jens Gottlieb, Plankstadt (DE)

(73) Assignee: SAP SE, Walldorf (DE)

( * ) Notice: Subject to any disclaimer, the term of this patent is extended or adjusted under 35 U.S.C. 154(b) by 590 days.

(21) Appl. No.: 13/834,903

(22) Filed: Mar. 15, 2013

(65) Prior Publication Data

US 2014/0279661 A1    Sep. 18, 2014

(51) Int. Cl.
    G06Q 10/08    (2012.01)
    G06Q 50/28    (2012.01)

(52) U.S. Cl.
    CPC ....... G06Q 10/08355 (2013.01); G06Q 50/28 (2013.01)

(58) Field of Classification Search
    CPC .............................................. G06Q 10/08355
    See application file for complete search history.

(56) References Cited

U.S. PATENT DOCUMENTS

| | | |
|---|---|---|
| 5,938,720 A | 8/1999 | Tamai |
| 6,591,266 B1 * | 7/2003 | Li ..................... G06F 17/30902 |
| 7,403,992 B2 | 7/2008 | Tilander et al. |
| 7,920,961 B2 | 4/2011 | Mandel et al. |
| 7,983,942 B2 | 7/2011 | Malitski et al. |
| 8,046,161 B2 | 10/2011 | Peterkofsky et al. |
| 8,195,496 B2 | 6/2012 | Gottlieb et al. |
| 8,311,904 B2 | 11/2012 | Steinbach et al. |

(Continued)

FOREIGN PATENT DOCUMENTS

| | | |
|---|---|---|
| EP | 1470511 A2 | 10/2004 |
| EP | 1869404 A2 | 12/2007 |

OTHER PUBLICATIONS

Trucking Technology, "Prophesy Transportation Software," 7.2:20, M2Media360, May 2000.*

(Continued)

*Primary Examiner* — Nathan Erb
(74) *Attorney, Agent, or Firm* — Brake Hughes Bellermann LLP

(57) ABSTRACT

A transportation management system may include a connection cache configured to store connection-relevant transportation information for transportation objects. The connection-relevant transportation information may have been replicated from at least one of a plurality of transportation object sources including at least a first database storing schedules, a second database storing freight bookings, and a third database storing freight orders. The transportation management system may also include a connection cache access engine configured to receive transportation parameters including at least a first location and a second location, and query the connection cache to dynamically select one or more transportation objects from the connection cache related to at least one of the schedules, the freight bookings, and the freight orders, that are relevant for the first location and the second location.

19 Claims, 9 Drawing Sheets

(56) References Cited

U.S. PATENT DOCUMENTS

| | | | |
|---|---|---|---|
| 2002/0019759 A1 | 2/2002 | Arunapuram et al. | |
| 2002/0095355 A1* | 7/2002 | Walker | G06Q 30/06 |
| | | | 705/80 |
| 2002/0156629 A1* | 10/2002 | Carberry | G10L 15/1822 |
| | | | 704/257 |
| 2003/0135304 A1 | 7/2003 | Sroub et al. | |
| 2003/0172007 A1 | 9/2003 | Helmolt et al. | |
| 2004/0054549 A1* | 3/2004 | Chittenden et al. | 705/1 |
| 2004/0177070 A1 | 9/2004 | Lin et al. | |
| 2007/0136079 A1 | 6/2007 | Beykirch et al. | |
| 2008/0077464 A1 | 3/2008 | Gottlieb et al. | |
| 2010/0228574 A1 | 9/2010 | Mundinger et al. | |
| 2010/0287073 A1 | 11/2010 | Kocis et al. | |
| 2011/0071955 A1 | 3/2011 | Nakamura et al. | |
| 2012/0078743 A1* | 3/2012 | Betancourt | 705/26.3 |
| 2012/0158441 A9 | 6/2012 | Kane | |
| 2012/0226624 A1 | 9/2012 | Song et al. | |
| 2013/0024404 A1* | 1/2013 | Zacharia et al. | 706/12 |
| 2014/0032440 A1 | 1/2014 | Chandrashekar et al. | |

OTHER PUBLICATIONS

"SAP Transportation Management", SAP, 2011, 24 pages.
Dorer, et al, "An Adaptive Solution to Dynamic Transport Optimization", AAMAS, Jul. 25-29, 2005, pp. 45-51.

* cited by examiner

FIG. 5

TRANSPORTATION CONNECTION CACHE FOR DYNAMIC NETWORK AND ROUTE DETERMINATION

BACKGROUND

Determining a transportation plan to ship goods over a world-wide network involving many possible modes of transport (e.g., air, ocean, etc.) while minimizing costs and satisfying all constraints is a challenging task. For example, this may be challenging, in particular for a complex network containing many alternative routes, numerous existing freight documents for different modes of transport, and the fact that a user may expect transportation plan results in a relatively short period of time.

Multiple object types are relevant for determining connections in the system, e.g., schedules and different kinds of freight documents such as road freight orders, rail freight orders, air freight bookings and ocean freight bookings. Usually, different objects are stored in different database tables, which have separate access structures. In other words, the essential information relevant for the transportation capabilities is spread over multiple databases, which may contain much more information than needed. As such, conventional transportation planning mechanisms that access and search many different types of databases may be relatively slow and ineffective. In addition, each new type representing a possible connection must be accessed and integrated into the transportation planning logic separately.

SUMMARY

The embodiments may provide a transportation management system for retrieving transportation information related to a shipment of goods. The transportation management system may include a connection cache configured to store connection-relevant transportation information for transportation objects. The connection-relevant transportation information may have been replicated from at least one of a plurality of transportation object sources including at least a first database storing schedules, a second database storing freight bookings, and a third database storing freight orders. The transportation management system may also include a connection cache access engine configured to receive transportation parameters including at least a first location and a second location, and query the connection cache to dynamically select one or more transportation objects from the connection cache related to at least one of the schedules, the freight bookings, and the freight orders, that are relevant for the first location and the second location.

The connection cache may include a replication component configured to replicate the connection-relevant transportation information from transportation objects in the plurality of transportation object sources.

The plurality of transportation object sources may further include a fourth database storing transportation lanes, and the connection cache access engine may be configured to select at least one transportation object from the connection cache related to at least one transportation lane that is relevant for the first location and the second location.

The plurality of transportation object sources may further include a fifth database storing default routes, and the connection cache access engine may be configured to select at least one transportation object from the connection cache related to at least one default route that is relevant for the first location and the second location. The at least one default route may provide an existing defined route between the first location and the second location.

The transportation management system may further include a routing selector configured to select a transportation network including determining connections within the transportation network for the first location and the second location based on the connection-relevant transportation information in the connection cache, and a transportation proposal unit configured to determine one or more transportation proposals based on the determined connections within the selected transportation network. Each transportation proposal may provide a different transportation plan for transporting the goods from the first location to the second location.

The connections may include at least one of a direct or multi-stop schedule, a freight booking, a freight order, a transportation lane, and a default route between the first location and the second location.

The routing selector may include a transshipment location determination unit configured to determine a first explicitly assigned hub associated with the first location, and a second explicitly assigned hub associated with the second location, and the routing selector may be configured to select transportation objects for the transportation network using the first explicit hub and the second explicit hub as entries into the connection cache.

Also, the routing selector may be configured to determine at least one implicitly assigned hub associated with the first location and at least one implicitly assigned hub associated with the second location based on an analysis of the connection-relevant transportation information of the connection cache.

The routing selector may further includes a path finder configured to create and verify available paths associated with the implicitly and explicitly assigned hubs, and the routing selector may be configured to select the connections having verified paths.

The transportation management system may further include a geo-map unit configured to display a map providing a visualization of the one or more transportation proposals based on the determined connections from the routing selector.

The embodiments may include a computer program product tangibly embodied on a non-transitory computer-readable storage medium and including executable code that, when executed, is configured to cause at least one processor to retrieve transportation information related to a shipment of goods. The executable code may include instructions to receive transportation parameters including at least a first location and a second location, and query a connection cache based on the transportation parameters. The connection cache may store connection-relevant transportation information for transportation objects. The connection-relevant transportation information may have been replicated from at least one of a plurality of transportation object sources including at least a first database storing schedules, a second database storing freight bookings, and a third database storing freight orders. The instructions may include instructions to select one or more transportation objects from the connection cache related to at least one of the schedules, the freight bookings, and the freight orders, that are relevant for the first location and the second location.

The plurality of transportation object sources may further include a fourth database storing transportation lanes, and the instructions to select one or more transportation objects may include selecting at least one transportation object from the connection cache related to at least one transportation lane that is relevant for the first location and the second location.

The plurality of transportation object sources may further include a fifth database storing default routes, and the instructions to select one or more transportation objects may include selecting at least one transportation object from the connection cache related to at least one default route that is relevant for the first location and the second location. The at least one default route may provide an existing defined route between the first location and the second location.

The instructions may further include instructions to select a transportation network including determining connections within the transportation network for the first location and the second location based on the connection-relevant transportation information in the connection cache, and determine one or more transportation proposals based on the determined connections within the selected transportation network. Each transportation proposal may provide a different transportation plan for transporting the goods from the first location to the second location.

The connections may include at least one of a direct or multi-stop schedule, a freight booking, a freight order, a transportation lane, and a default route between the first location and the second location.

The instructions may include instructions to determine a first explicitly assigned hub associated with the first location, and a second explicitly assigned hub associated with the second location, and select transportation objects for the transportation network using the first explicit hub and the second explicit hub as entries into the connection cache including determining at least one implicitly assigned hub associated with the first location and at least one implicitly assigned hub associated with the second location based on an analysis of the connection-relevant transportation information of the connection cache.

The embodiments may provide a method for determining one or more transportation proposals for a shipment of goods. The method may include replicating, by at least one processor, connection-relevant transportation information from at least one of a plurality of transportation object sources. The plurality of transportation object sources may include at least a first database storing schedules, a second database storing freight bookings, and a third database storing freight orders. The method may include storing, by the at least one processor, the connection-relevant transportation information as transportation objects to create a connection cache database, receiving, by the at least one processor, transportation parameters for the shipment of goods from a first location to a second location, and selecting, by the at least one processor, a transportation network including determining connections within the transportation network for the first location and the second location based on the connection-relevant transportation information in the connection cache database. The method may further include determining, by the at least one processor, one or more transportation proposals based on the determined connections within the selected transportation network. Each transportation proposal may provide a different transportation plan for transporting the goods from the first location to the second location.

The connections may include at least one of a direct or multi-stop schedule, a freight booking order, a freight order, a transportation lane, and a default route. Also, the method may include determining a first explicitly assigned hub associated with the first location, and a second explicitly assigned hub associated with the second location, and selecting transportation objects for the transportation network using the first explicit hub and the second explicit hub as entries into the connection cache database.

BRIEF DESCRIPTION OF THE DRAWINGS

FIG. 5 illustrates a transportation proposal user interface provided by the transportation management system of FIG. 1A according to an embodiment;

DETAILED DESCRIPTION

The embodiments provide a transportation connection cache for use within a transportation management system. For example, a transportation proposal unit may determine one or more transportation proposals for scheduling a shipment of goods from a starting location to a destination location. Conventionally, the transportation proposal unit may determine these transportation plans from a number of different sources such as a schedule database, a bookings order database, and a freight order database, among others, for example. However, independently accessing these databases to determine the optimal transportation connections may be relatively time consuming. Therefore, according to the embodiments, connection-relevant information for the schedules, the booking orders, and the freight orders, etc., may be replicated and stored in the transportation connection cache.

The transportation connection cache may be considered a new layer of abstraction, which may be considered to suppress or conceal the details of the connection objects that are not related to determining possible locations and connections between the locations for determining transportation proposals for a shipment of goods. For example, the transportation connection cache may abstract only the connection-relevant information from the transportation objects (e.g., schedules, freight documents such as freight bookings and freight orders) in the existing databases or database tables, and may represent them in a unified fashion as from-to-connections.

According to the embodiments, the transportation proposal unit may determine one or more transportation proposals based on the transportation connection cache, which may increase the performance of the transportation management system. For example, the transportation proposal unit may communicate with the transportation connection cache via a routing selector that uses a single uniform interface for access to the transportation connection cache without having to access and search multiple databases associated with the schedules, freight bookings, freight orders, and/or transportation lanes, which may contain much more information than the connection-relevant transportation information of the transportation connection cache. These and other features of the embodiments will be discussed below with reference to the figures.

Figure 1A:
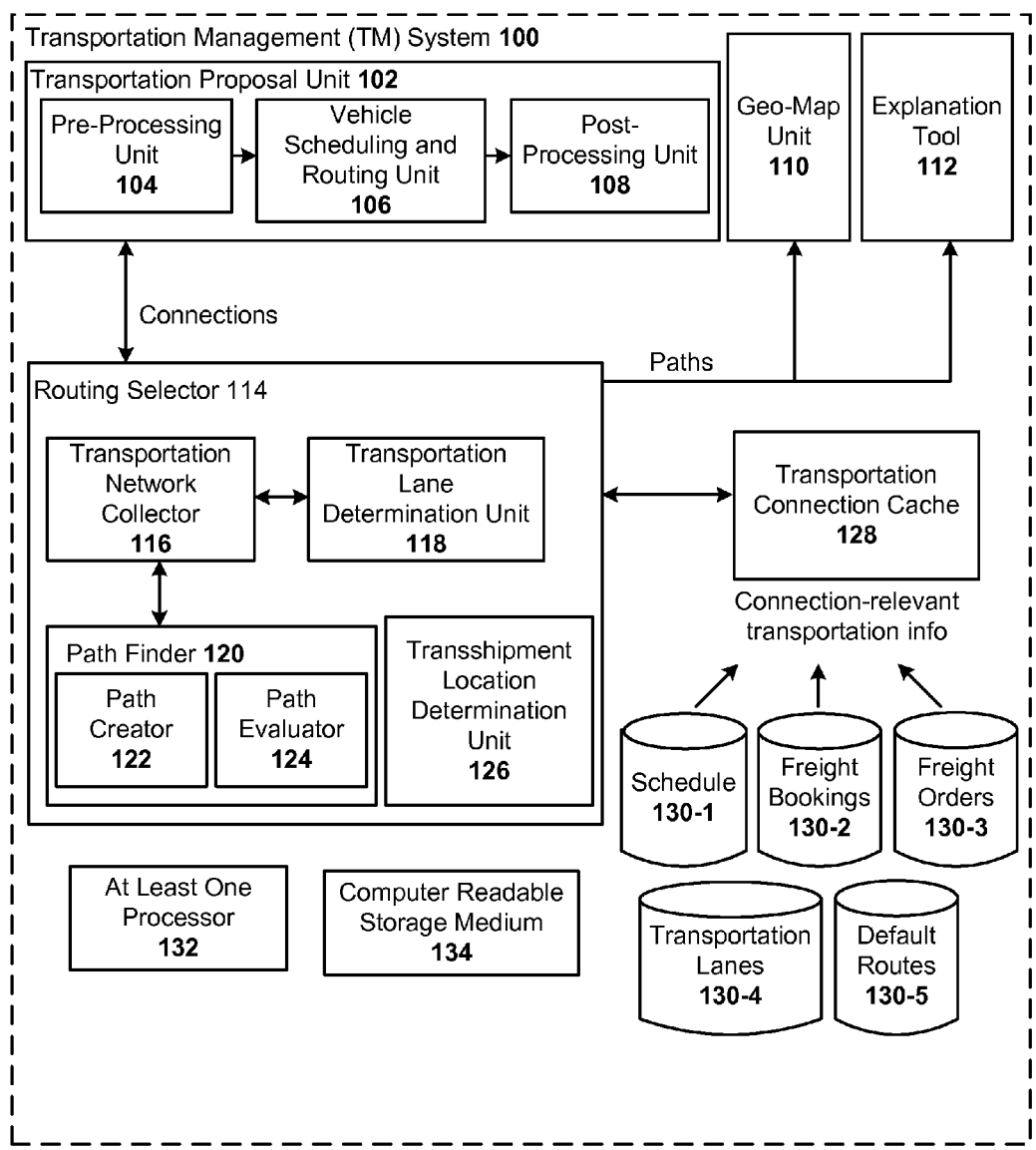
FIG. 1A illustrates a transportation management system for determining one or more transportation proposals for a shipment of goods using a transportation connection cache according to an embodiment.

FIG. 1A illustrates a transportation management system 100 for determining one or more transportation proposals for a shipment of goods using a transportation connection cache according to an embodiment.

The transportation management system 100 may be any type of system supporting activities connected with the physical transportation of goods from a first location (starting location) to a second location (destination location). Generally, the transportation management system 100 may create orders, transfer orders and/or deliveries from an Enterprise Resource Planning (ERP) system, create freight bookings, plan the transportation, select carriers, tender transportation services, dispatch and monitor the transportation, calculate the transportation charges for the ordering party and the supplier side, and/or consider foreign trade and dangerous goods regulations.

According to one aspect, the transportation management system 100 may determine one or more transportation proposals that satisfy constraints (e.g., starting and destination locations, quantity, type of goods, etc.). For example, given a set of transportation demands (specified by source location, destination location, desired pickup and delivery times), a transportation network (specified by transshipment locations, movement capabilities between locations, and schedules connecting multiple locations), one or more current transportation plans (represented by freight documents for all modes of transport), the transportation management system 100 may determine one or more transportation proposals for the transportation demands which minimizes costs and satisfies the imposed constraints.

However, checking all possible paths through the transportation network may be considered relatively time consuming. For example, a complex transportation network may contain many different alternative routes, and numerous existing freight documents for all modes of transport. In particular, multiple object types are relevant for determining connections in the system, e.g., schedules and different kinds of freight documents such as freight orders, air freight bookings, and ocean freight booking. Usually, different objects are stored in different databases (e.g., databases 130) and have separate access structure. For example, the schedules, freight bookings, freight orders, transportation lanes, and/or default routes, are maintained in separate databases (e.g., databases 130), and have separate access structures. Generally, these types of objects may be referred to as transportation objects, and the details of each type of transportation object are further explained below. Further, the schedules, freight bookings, and/or freight orders, etc. (as maintained in these databases) usually contain more information than required to select the appropriate connections for determining a transportation proposal for the shipment of goods from the starting location to the destination location.

As such, the transportation management system 100 may include a transportation connection cache 128 that stores connection-relevant transportation information replicated from the databases 130. For example, the transportation connection cache 128 may store a smaller set of information related to the schedules, freight bookings, and/or the freight orders, etc. in the transportation connection cache 128 than what is originally stored in these databases 130. In one example, the connection-relevant information may include, for a given source and destination, the relevant transportation objects per mode of transport and means of transport, each with a validity period.

The plurality of databases 130 may include a first database 130-1, a second database 130-2, a third database 130-3, a fourth database 130-4, and a fifth database 130-5. However, the plurality of databases 130 may include any number of databases 130, where each database 130 may store a different type of transportation object (or multiple types). Also, it is noted that the databases 130 may represent separate databases or separate database tables.

The first database 130-1 may store schedules. Each schedule may define the transportation capabilities of a carrier such as the dates and times for the shipment of goods. Generally, the schedule may represent a service offered by an external company (carrier) such as ocean, air, rail, and/or truck carriers. The schedules may include direct schedules for a first location to a second location, or multi-stop schedules having a series of locations between the first location and the second location.

The second database 130-2 may store freight bookings. A freight booking may refer to an air-freight booking or an ocean-freight booking. Generally, a freight booking may be an order whose execution is planned by a carrier, for example. The freight booking may contain the planning information for the logistical processing, e.g., fixed departure times of the carrier. Among other information, booking orders may include planning information (e.g., planned means of transport and stages), additional business partners, transportation charges, transportation dependencies (e.g., related freight orders), house bill of landings, and/or information about the carrier ranking, etc.

The third database 130-3 may store freight orders. A freight order may refer to land such as a road-freight order or a rail-freight order. Therefore, a freight order may be similar to a booking order (except that the freight order applies to road or rail). The freight order may include information regarding the planned departure times of the vehicle, the business partners, the document dependencies, transportation charges, the house bill of landing, and/or status information, for example. The term freight document may refer to any type of freight document such as road freight orders, rail freight orders, air freight bookings, and ocean freight bookings.

The fourth database 130-4 may store transportation lanes. A transportation lane may be the relationship between at least two locations, two transportation zones, or a combination of locations and zones that expresses the direct reachability of the locations or of all locations within the zones for a specific means of transport. A transportation lane is defined by a source location or zone, a destination location or zone, and a means of transport. A transportation lane may include information such as products that can be procured over this transportation lane, and the means of transport that can be used for transporting the products being procured. A means of transport represents a class of trucks, ships, or airplanes that are used to transport goods from one location to another over a transportation lane. The means of transport may be assigned by specifying the associated parameters such as the transportation duration, distance, and costs.

The fifth database 130-5 may store default routes. A default route is a predefined path, which connects a source and a destination through the transportation network. Given a new freight unit to be transported and a default route that matches the freight unit's source and destination, the freight unit can be transported according to the path defined by the default route. In this sense, the default route serves as a template for defining a transportation plan for the freight unit at hand.

The transportation connection cache 128 may include information that is necessary for determining the transportation network for transportation proposal, as opposed to the larger set of information contained in the databases 130. For example, upon creation of a transportation object (e.g., schedule, freight document, transportation lane, default route etc.) within its respective database 130, the transportation connection cache 128 may be populated with connection-relevant transportation information associated with the created transportation object, which includes only the details for determining possible connections without the other details such as the house bill of landing, for example. In other words, only the information from the transportation objects (schedules, freight bookings, freight orders, transportation lanes, default routes, etc.) that are relevant to determining connections may be populated into the transportation connection cache 128. As such, the transportation connection cache 128 may include transportation objects related to the schedules, freight bookings, freight orders, transportation lanes, default routes, however each of these transportation objects of the transportation connection cache 128 may include less information than the corresponding transportation objects in the databases 130.

Then, the transportation management system 100 may determine one or more transportation proposals based on the transportation connection cache 128, which provides faster access as compared to collecting data out of numerous different databases, as further described below. Further, with use of the transportation connection cache 128, the transportation management system 100 may dynamically select the relevant schedules, freight documents, and/or transportation lanes, and may dynamically determine transshipment options (e.g., implicit transshipment locations, which are further discussed below).

Figure 1B:
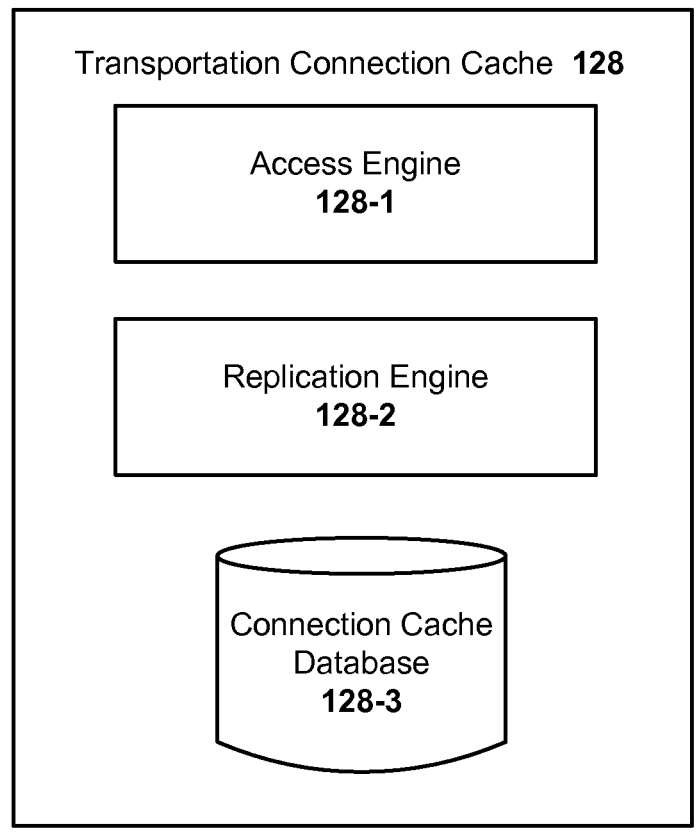
FIG. 1B illustrates an example of the transportation connection cache according to an embodiment.

FIG. 1B illustrates an example of the transportation connection cache 128 according to an embodiment. For example, the transportation connection cache 128 may include an access engine 128-1, a replication engine 128-2, and a connection cache database 128-3, as further described below.

The access engine 128-1 may be configured to access the connection cache database 128-3. For example, the access engine 128-1 may handle read/write commands for access to the connection cache database 128-3. In one example, the access component 128-1 may receive any queries for any of the type of data stored in the connection cache database 128-3 (e.g., freight bookings, schedules, transportation lanes, freight orders, default routes, etc.) via a single interface, and then locate and retrieve the relevant schedules, freight bookings, freight orders, transportation lanes, and/or default routes, etc., from the connection cache database 128-3 according to the transportation parameters, which may specify the locations, type of goods, specified pick up time, or generally any type of transportation parameter. In one example, the access component 128-1 may receive a request for a particular type of transportation object for a source location and a destination location, and then retrieve the relevant transportation objects(s) matching the source location and the destination location, e.g., all schedules from location A to location B.

The replication engine 128-2 may be configured to replicate the connection-relevant transportation information from the transportation objects in the databases 130. The replication engine 128-2 may handle the information replication from the transportation objects stored in their separate databases or database tables. Upon creation of a transportation object (e.g., schedule, freight document, transportation lane, default route, etc.) within its respective database 130, the replication engine 128-2 may replicate the connection-relevant transportation information associated with the created or changed transportation object, which includes only the details for determining possible connections without the other details such as the house bill of landing, for example. Then, the replication engine 128-2 may store the replicated information in the connection cache database 128-3. For example, the replication component 128-2 may create or change entries for each of the replicated information, which may contain the connection-relevant information for the freight bookings, schedules, transportation lanes, freight orders, default routes, etc. In one example, the connection-relevant information may include, for a given source and destination, the relevant transportation objects per mode of transport and means of transport, each with a validity period.

The connection cache database 128-3 may be configured to store the connection-relevant transportation information as transportation objects having only the connection-relevant transportation information. The connection cache database 128-3 may be any type of relational database, or may be an in-memory database. The in-memory database may be a type of database system that supports real-time analytics and transactional processing including replication and aggregation techniques. The in-memory database may include a parallel processing data store that utilizes row-based, column-based, and/or object-based storage techniques.

Referring back to FIG. 1A, the transportation management system 100 may include a transportation proposal unit 102 for providing transportation solutions (e.g., the transportation proposals), a routing selector 114 for selecting a transportation network and determining locations and connections within the transportation network that satisfy the transportation parameters (starting location, destination location, specified dates/times, etc.) based on the transportation connection cache 128 (e.g., the resulting information is used by the transportation proposal unit 102), a geo-map unit 110 configured to display a map providing a geographical visual display of the transportation proposals using information from the transportation connection cache 128, an explanation tool providing transportation details of the locations and the connections using the information from the transportation connection cache 128, and the transportation connection cache 128 that stores connection-relevant transportation information that has been replicated from at least one of plurality of sources including the database 130.

Further, the transportation management system 100 may include at least one processor 132, and a computer-readable storage medium 134. The computer-readable storage medium 134 may include instructions, when executed by at least one processor 148, cause the at least one processor 132 to implement the functionalities of the transportation management 100 as described herein. Also, the transportation management system 100 may include other components that are well known to one of ordinary skill in the art.

The transportation proposal unit 102 may be configured to determine one or more transportation proposals for the shipment of goods from the starting location to the destination location. For example, the transportation proposal unit 102 may determine transportation solutions considering restrictions (e.g., times, incompatibilities, and geographical connections) for to-be-delivered freight units. The transportation proposal unit 102 may represent the end-to-end process, e.g., the user interaction to the backend processing to the result display on the transportation user interface. The transportation proposal unit 102 may include a pre-processing unit 104, a vehicle scheduling and routing unit 106, and a post-processing unit 108.

Generally, the pre-processing unit 104 may be configured to pre-process the relevant information associated with a transportation plan analysis, and convert this information to a format compatible with the vehicle scheduling and routing unit 106. In one example, the pre-processing unit 104 may select all relevant transportation management objects (e.g., the master data and business documents). In addition, in order to carry out its pre-processing, the pre-processing unit 104 may utilize a routing selector 114 that selects the transportation network including the connections for the starting location and the destination location for the transportation of goods based on the transportation connection cache 128.

The connections may include locations, transshipment locations, schedules, transportation lanes, freight bookings, default routes, and/or freight orders, which are relevant to the transportation proposal. A location may be a logical or physical place in which products, or resources, are managed on a quantity. A location may be identified by a name, and defined by its name and type. Types of locations may be production plant, distribution center, shipping point, stock transfer point, customer, vendor, terminal, and/or store.

A transshipment location may be a location that is used for unloading goods from one vehicle resource and loading it into another vehicle resource during the transportation process. Transshipment locations are used when different means of transport or different carriers have to be used in the transportation process. Further, transshipment locations are used when consolidating or de-consolidating goods to be transported. A transshipment location may be defined by assigning a location to either another location or to a transportation zone. When a transshipment location is assigned to a transportation zone, the transshipment location can be used as the transshipment location by all locations that are part of that transportation zone. Also, a transshipment location may be defined by assigning a location to a transshipment location chain. Examples for transshipment locations are ports, airports, railway stations or distribution centers.

In one example, for a shipment of goods from the starting location to the destination location, the connections may include 1) a direct schedule from the starting location to the destination location, 2) a multi-stop schedule from the starting location to the destination location, 3) a booking order from the starting location to the destination location, 4) a freight order from the starting location to the destination location, and 5) a transportation lane from the starting location to the destination location. The routing selector 114 may quickly obtain the connections (e.g., the direct schedule, the multi-stop schedule, the booking order, the freight order, default route, and/or the transportation lane) that satisfy the transportation parameters by accessing the transportation connection cache 128. For example, instead of accessing multiple databases, the routing selector 114 accesses and queries a single database (the transportation connection cache 128) that stores the connection-relevant transportation information related to the schedules, freight booking orders, freight orders, default routes, and/or transportation lanes.

The pre-processing unit 104 may collect the relevant connections determined by the routing selector 114, and transfer this information to the vehicle scheduling and routing unit 106.

The vehicle scheduling and routing unit 106 may determine one or more transportation proposals associated with the shipment of goods from the starting location to the destination location. Each transportation proposal may provide a different transportation plan for transporting the goods from the starting location to the destination location (e.g., a number of alternative paths or routes). In particular, the vehicle scheduling and routing unit 106 may assign freight units to capacities in a cost-effective way while adhering to the constraints, and to determine the sequence of deliveries and the transportation dates and times.

The post-processing unit 108 may perform post-processing operations on the determined transportation proposals including formatting the determined transportation proposals for display on a transportation user interface and storing them as transportation management objects.

The routing selector 114 may include a transportation network collector 116, a transportation lane determination unit 118, a path finder 120, and a transshipment location determination unit 126.

The transportation network collector 116 may be responsible for pre-processing all relevant transportation networks, enriching them with the required information, and mapping the information into an internal planning format that is compatible with the pre-processing unit 104. For example, the transportation network collector 116 may receive the results of the transportation lane determination unit 118, the path finder 120, and the transshipment location determination unit 126, and format this information to be provided to the pre-processing unit 104.

In one example, the transportation network collector 116 may be configured to call the transportation lane determination unit 118, and the path finder 120. Then, the path finder 120 may call the transshipment location determination unit 126 that selects the entries into the transportation connection cache 128. The transshipment location determination unit 126 may obtain the relevant connections from the transportation connection cache 128, and then returns these connections to the path finder 120. The path finder 120 creates and verifies paths associated with the connections, and then returns this information to the transportation network collector 116. Then, the transportation network collector 116 formats the obtained information, which is then provided to back to the pre-processing unit 104.

The transshipment location determination unit 126 may be configured to determine explicitly assigned transport hubs. Then, the transshipment location determination unit 126 may determine implicitly assigned transport hubs using the transportation connection cache 128. Generally, a transport hub is a place where goods are exchanged between vehicles or between transport modes. The transport hub may be a transshipment location or a location.

In one example, the transshipment location determination unit 126 may determine one or more explicitly assigned transport hubs associated with the starting location. For example, the starting location may be associated with a transportation zone. The transshipment location determination unit 126 may determine the transport hubs that have been assigned to the transportation zone. Also, the transshipment location determination unit 126 may determine one or more explicitly assigned transport hubs associated with the destination location. For example, the destination location may be associated with a different transportation zone. The transshipment location determination unit 126 may determine the transport hubs that have been assigned to the transportation zone.

The transshipment location determination unit 126 uses the explicitly assigned transport hubs associated with the starting location and the destination location as entries into the transportation connection cache 128 for any possible connection/locations between the explicitly assigned transport hubs, e.g., implicitly assigned transport hubs, and the connections between the transport hubs.

In particular, after the transshipment location determination unit 126 determines the explicitly assigned hubs for the start and destination locations, the transshipment location determination unit 126 may determine the implicitly assigned hubs for the start location. To accomplish this, the transshipment location determination unit 126 accesses the transportation connection cache 128 via its interface, and determines all possible connections starting from the supplied locations, e.g., the starting location, the destination location, and the explicitly assigned hubs for the start and destination locations. Then, the transshipment location determination unit 126 may determine the implicitly assigned hubs for the destination location. To accomplish this, the transshipment location determination unit 126 accesses the transportation connection cache 128 via its interface, and determines all possible locations ending at the supplied locations, e.g., the starting location, the destination location, and the explicitly assigned hubs for the start and destination locations.

The path finder 120 may create and verify available paths associated with the implicitly and explicitly assigned hubs. Generally, the path finder 120 may apply the same logic as described above to determine all relevant hubs, fill location buffer for messages, create all available paths considering the assigned hubs, verify each link of found paths if a reachability exists, and evaluate paths (e.g., determine if valid path, add message). For example, the location identifiers associated with the connections may be in an unreadable format. As such, for determined locations, the path finder 120 may fill a location buffer with location information such that the determined location may be presented to the user in a readable format.

As a complex network may contain numerous potential paths between a source location and a destination location, the path finder 120 may employ heuristic information to determine only reasonable paths between the source location and the destination. In one example, with a source location of Frankfurt, Germany, and a destination location of Philadelphia, USA, it would make sense to consider a path via the ports Hamburg and Newark, but it would not make sense to consider a path via a port in Australia. The definition of a reasonable path may be based on the total distance or any other measure that measures the "geographical directness" of the path in relation to the source and destination.

The determined paths constitute a sub-network of the transportation network, and subsequent transportation planning algorithms may focus on this sub-network rather than having to explore the complete transportation network.

The path finder 120 may include a path creator 122 and a path evaluator 124. The path creator 122 may construct valid location sequences leading from the start location to the destination location considering the explicit and implicit assigned hubs. Also, the path creator 122 may determine the connections for each location sequence. The path evaluator 124 may analyze each result built by the path creator 122. For example, the path evaluator 124 may add messages and evaluates if the result is valid or not. The validity check of a path may consider the available capacity along the path (e.g. a certain booking along the path allows transporting only 20 tons but the freight unit at hand consists of 40 tons), incompatibilities of the goods (e.g. an air freight booking does not allow dangerous goods, but the freight unit contains dangerous goods), time constraints (e.g. the freight unit must be shipped within 5 days but the ocean schedule requires 3 weeks to deliver the freight), etc.

Figure 1C:
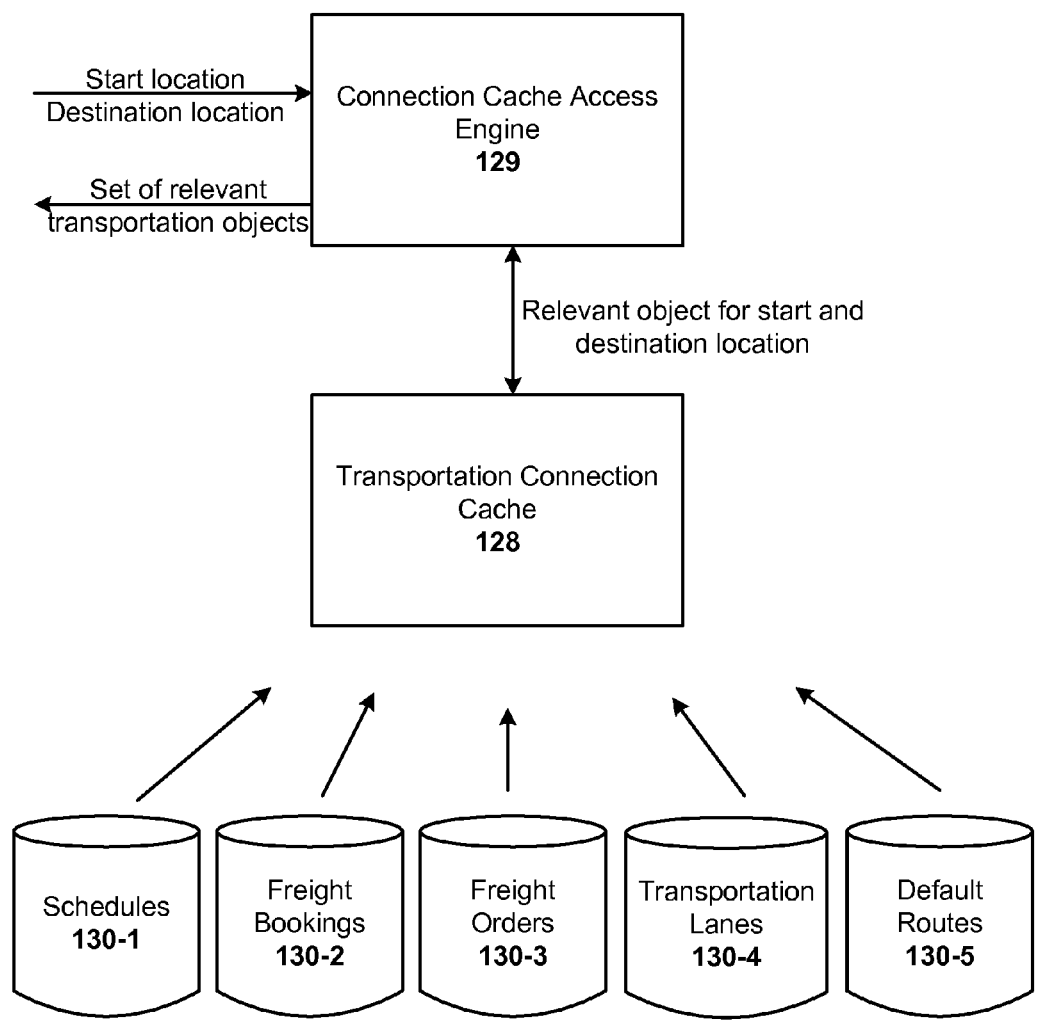
FIG. 1C illustrates a transportation management system for retrieving transportation information from the transportation connection cache according to an embodiment.

FIG. 1C illustrates a transportation management system 150 for retrieving transportation information from the transportation connection cache 128 according to an embodiment. For example, the transportation management system 150 may include a connection cache access engine 129, the transportation connection cache 128, and the plurality of databases 130.

In contrast to the transportation management system 100 of FIG. 1A, the transportation management system 150 of FIG. 1C is not necessarily limited to determining transportation proposals. Rather, the connection cache access engine 129 may quickly obtain the connection-relevant transportation information for the transportation objects related to schedules, freight bookings, freight orders, transportation lanes, and/or default routes for any type of purpose including the determination of transportation proposals. As such, the transportation management system 150 may include any of the components/functionalities previously explained with reference to the transportation management system 150 of FIG. 1A.

In one example, a transportation planner may just want to check whether it is possible at all to transport goods from a source to a destination, without determining a feasible transportation plan. In another example, the transportation planner just wants to check whether it is possible to reach a destination from a source by combining available schedules, without considering already existing freight documents. This can be accomplished by parameterizing the connection cache access engine 129 such that it only returns schedule connections.

The connection cache access engine 129 may be the access engine 128-1 of FIG. 1B, or a different functional component associated with the transportation management system 150. In one example, the connection cache access engine 129 may be configured to receive transportation parameters such as the starting location and the destination location, and then locate and retrieve the relevant schedules, freight bookings, freight orders, transportation lanes, and/or default routes, etc., from the transportation connection cache 128. For example, the connection cache access engine 129 may be configured to query the transportation connection cache 128 to dynamically select one or more transportation objects from the transportation connection cache 128 related to any of the above transportation objects that are relevant for the start location and the destination. In other words, the connection cache access engine 129 may be able to select the appropriate schedules, freight documents (freight bookings, freight orders, etc.), and transportation lanes, between the starting location and the destination location.

Figure 2:
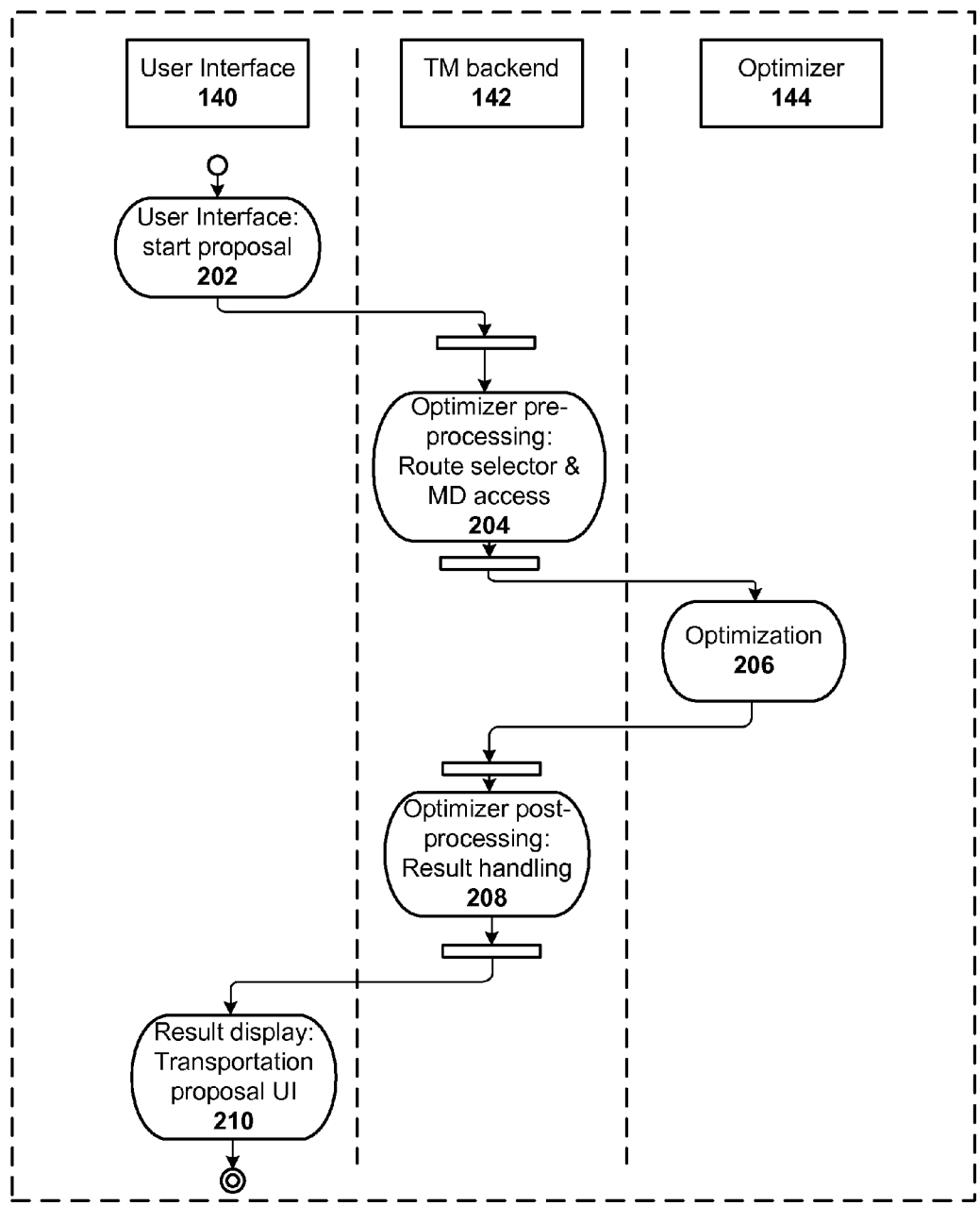
FIG. 2 illustrates an example of processing a transportation proposal using the transportation management system of FIG. 1A according to an embodiment.

FIG. 2 illustrates an example of processing a transportation proposal using the transportation management system 100 according to an embodiment. For example, the transportation management system 100 may includes a user interface 140, a transportation management backend component 142, and an optimizer 144. The user interface 140 may include a transportation management interface that allows a user to interact with the transportation management system 100. The transportation management backend component 142 may include hardware and software resources for handing the pre-processing and the post-processing of the transportation proposal. The optimizer 144 may include hardware and software resources for performing the functions of the vehicle scheduling and routing unit 106.

In operation 202, a user may start the transportation proposal. For example, a user may input transportation parameters such as the starting location and the destination location, specified pickup/drop-off times, types of goods, quantity of goods, and/or any other type of constraint. In operation 204, the transportation management backend component 142 may perform the pre-processing including the functionalities of the routing selector 114. In operation 208, the optimizer 144 may optimize the transportation proposals including performing the functionalities associated with the vehicle scheduling and routing unit 106. In operation 208, the transportation management backend component 142 may perform the post-processing including the functionalities of the post-processing unit 108. In operation 210, the user interface 140 may provide the transportation results including one or more transportation proposals, which are further illustrated in FIGS. 5 and 6.

Figure 3:
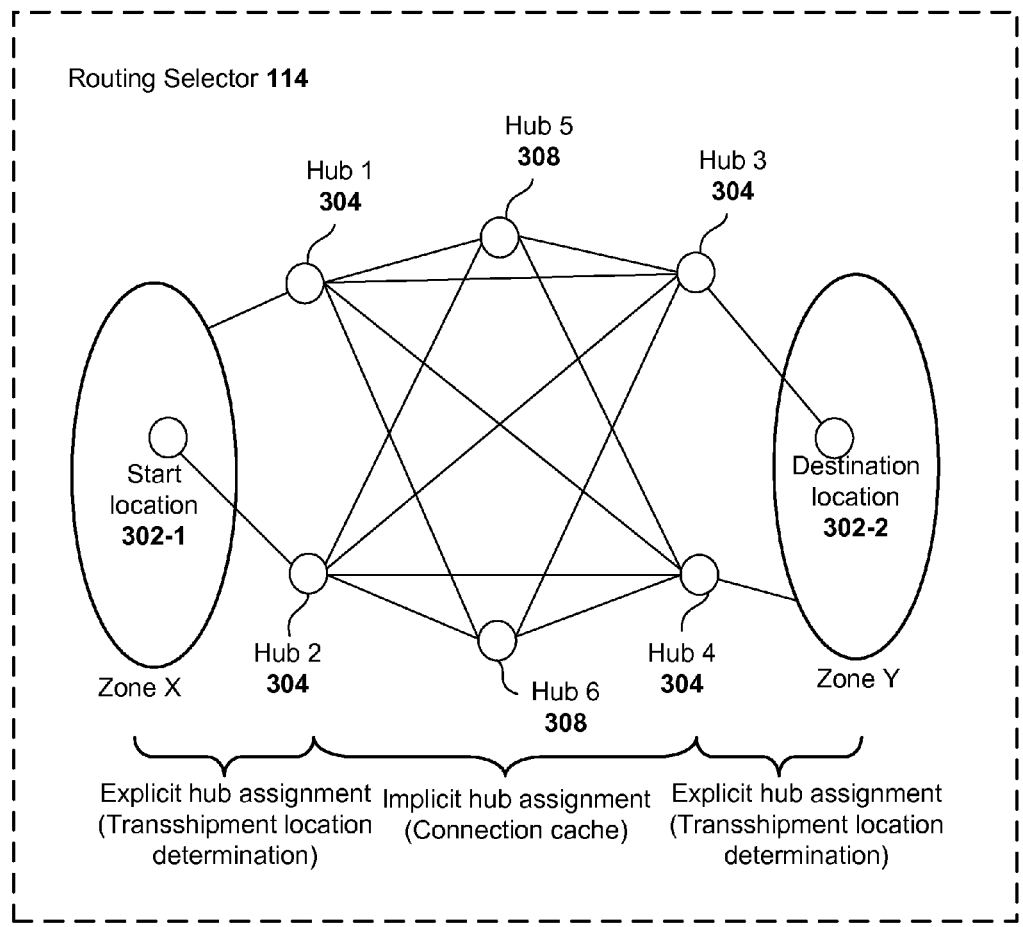
FIG. 3 illustrates a graphical representation of a routing selector of the transportation management system of FIG. 1A according to an embodiment.

FIG. 3 illustrates a graphical representation of the routing selector 114 according to an embodiment. For example, FIG. 3 illustrates a transportation network including the locations and the connections determined by the routing selector 114.

The routing selector 114 may determine one or more explicitly assigned hubs 304 associated with a start location 302-1, and determine or more explicitly assigned hubs 304 associated with a destination location 302-1. In particular, the transshipment location determination unit 126 may determine one or more explicitly assigned transport hubs 304 associated with the starting location, e.g., Hub 1 and Hub 2. For example, the starting location may be associated with a transportation zone (Zone X). The transshipment location determination unit 126 may determine the transport hubs (Hub 1, Hub 2) that have been assigned to the transportation zone (Zone X). Also, the transshipment location determination unit 126 may determine one or more explicitly assigned transport hubs 304 (Hub 3, Hub 4) associated with the destination location 302-1. For example, the destination location may be associated with a different transportation zone (Zone Y). The transshipment location determination unit 126 may determine the transport hubs (Hub 3, Hub 4) that have been assigned to the transportation zone (Zone Y).

The routing selector 114 may determine one or more implicitly assigned hubs (Hub 5, Hub 6) and the connections between the locations (start location 301-1, hubs 304, and hubs 308) using the transportation connection cache 128. In particular, after the transshipment location determination unit 126 determines the explicitly assigned hubs for the start and destination locations, the transshipment location determination unit 126 may determine the implicitly assigned hubs for the start location. To accomplish this, the transshipment location determination unit 126 accesses the transportation connection cache 128 via its interface, and determines all possible connections starting from the supplied locations, e.g., the starting location 302-1, destination location 302-1, and the explicitly assigned hubs 304 for the start and destination locations 302. Then, the transshipment location determination unit 126 may determine the implicitly assigned hubs 308 for the destination location 302-2. To accomplish this, the transshipment location determination unit 126 accesses the transportation connection cache 128 via its interface, and determines all possible connections ending at the supplied locations, e.g., the starting location 302-1, the destination location 302-2, and the explicitly assigned hubs 304 for the start and destination locations 302.

Figure 4:
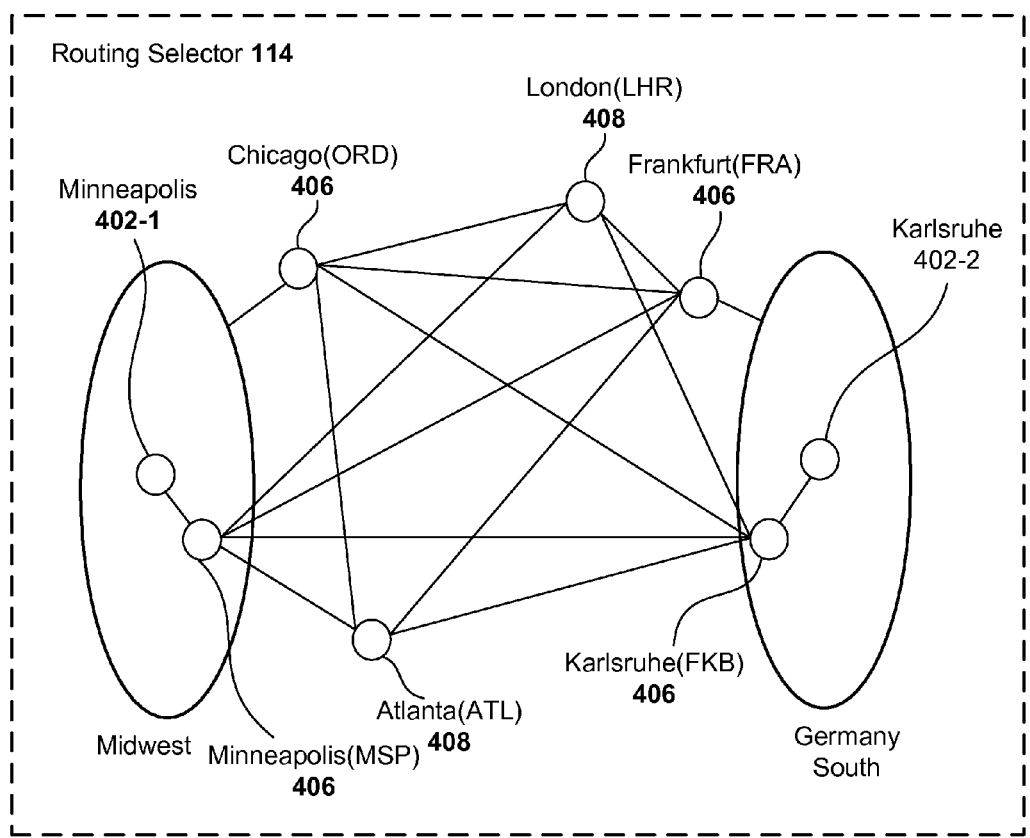
FIG. 4 illustrates a graphical representation of the routing selector of the transportation management system of FIG. 1A with mapping information according to an embodiment.

FIG. 4 illustrates a graphical representation of the routing selector 114 with mapping information according to an embodiment. The example of FIG. 4 relates to a transportation proposal for the shipment of goods from Minneapolis to Karlsruhe. In this example, the transportation network determined by the routing selector 114 provides the different possible paths for the shipment of goods between Minneapolis and Karlsruhe. The routing selector 114 may determine the transportation network including the locations and the connectors in the same manner as described with reference to FIG. 3. However, in the example of FIG. 4, geographical mapping information is provided along with the determined locations.

Figure 5:
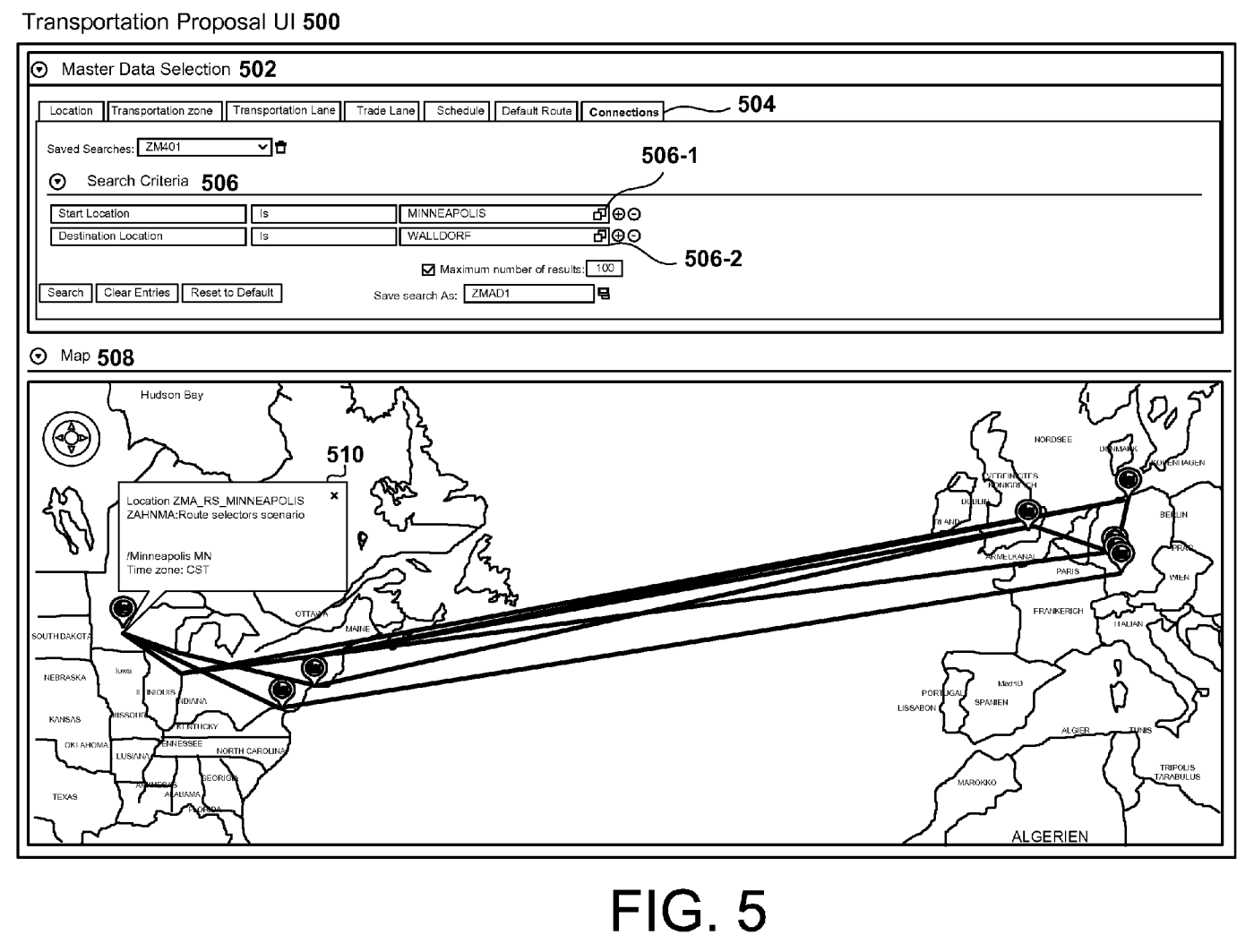

FIG. 5 illustrates a transportation proposal user interface 500 according to an embodiment. The transportation proposal user interface 500 may include a master data selection 502, search criteria 506, and a map 508 providing a geographical visualization of the connections for the transportation proposal. For example, a user may select connections 504 with the master data selection 502, and then define the search criteria 506 by supplying the start location 506-1 and the destination location 506-2. Then, when the user selects the search button, the map 508 may be populated with the various connections for shipping between the start location 506-1 and the destination location 506-2.

In addition, the map 508 may include an explanation box 510 that provides details regarding the location and/or the connection. For example, a user may select (or hover) over a particular location shown in the map 508, and the explanation box 510 may provide details of that location. Also, a user may select (or hover) or a particular connection (e.g., one of the lines) shown in the map 508, and the explanation box 510 may provide details regarding the connection.

Figure 6:
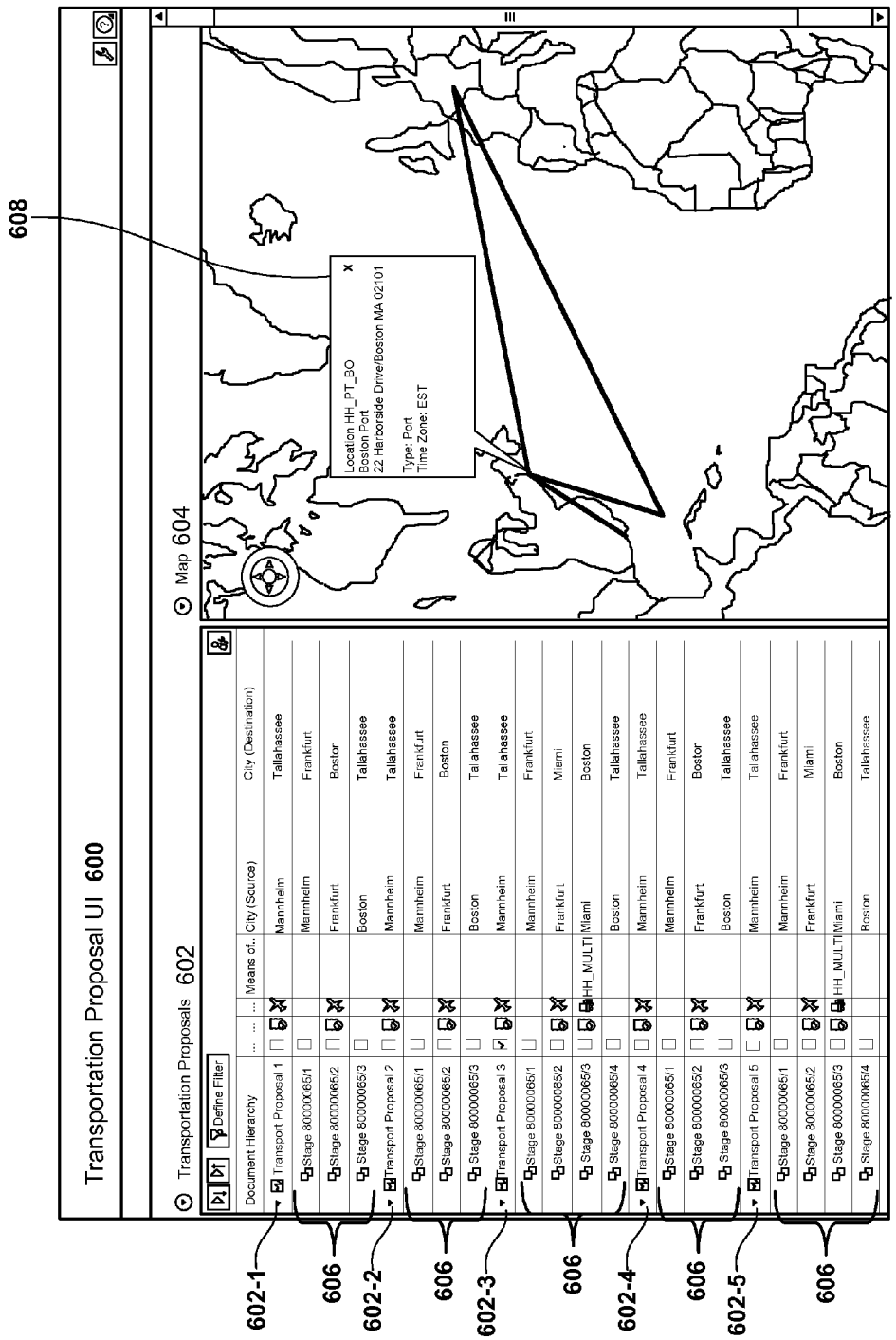
FIG. 6 illustrates a transportation proposal user interface provided by the transportation management system of FIG. 1A according to another embodiment.

FIG. 6 illustrates a transportation proposal user interface 600 according to an embodiment. The transportation proposal user interface 600 may provide a plurality of transportation proposals, e.g., as shown by transportation proposals 602. The example of FIG. 6 illustrates a first transportation proposal 602-1, a second transportation proposal 602-2, a third transportation proposal 602-3, a fourth transportation proposal 602-4, and a fifth transportation proposal 602-5. Each of the transportation proposals 602 includes the relevant connections 606. With respect to the first transportation proposal 602-1, the connections 606 include the details of each stage of the route, e.g., identification of the document (booking order, schedule, freight order, etc.), means of transport, and the source and the destination of that stage. Also, the transportation proposal user interface 600 may include a map 604 that geographically displays a particular transportation proposal 602, and an explanation box 608 (when activated) that provides details regarding a certain location and/or connection.

Figure 7:
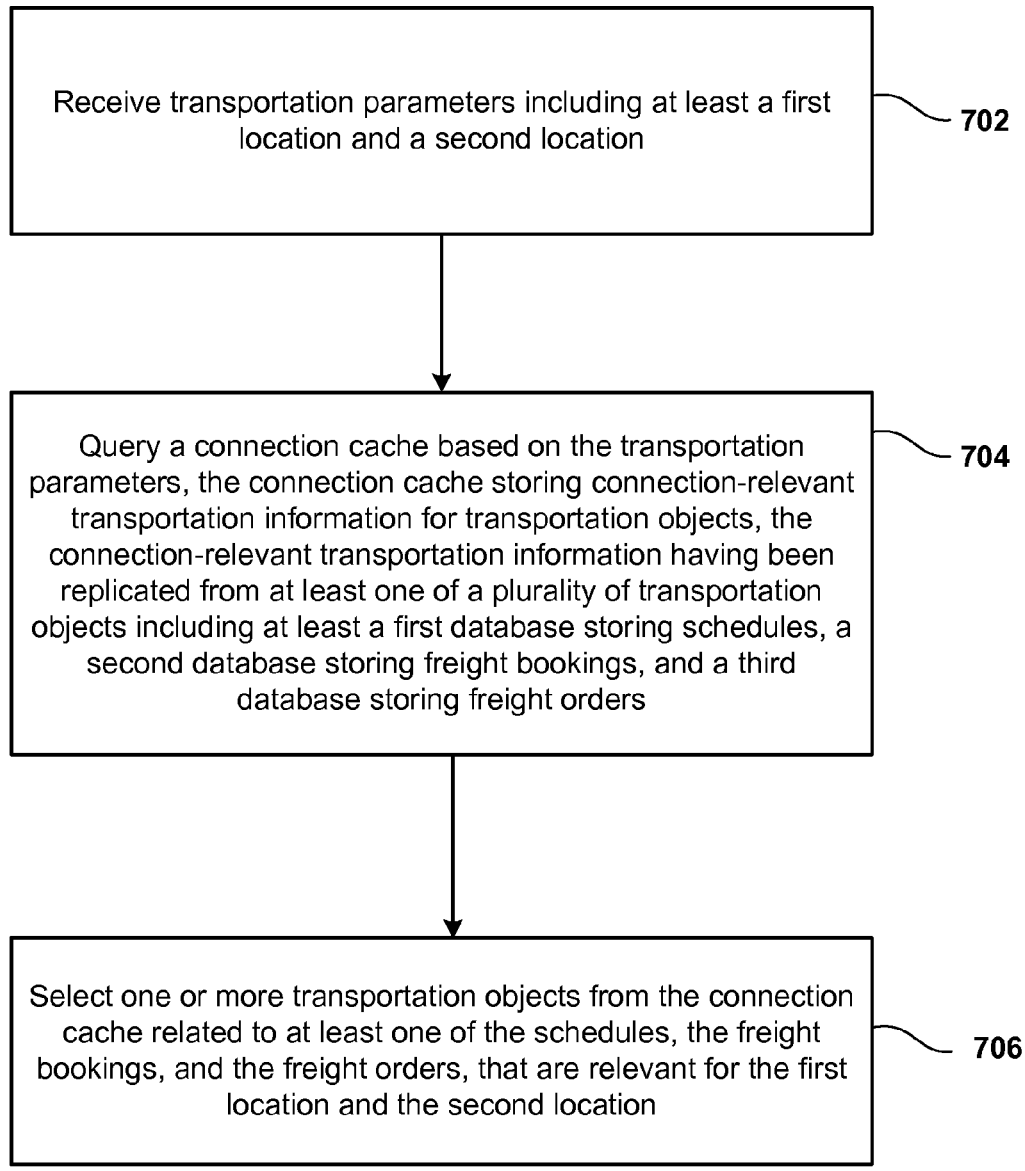
FIG. 7 is a flowchart illustrating example operations of the transportation management system of FIGS. 1A and/or 1C according to an embodiment.

FIG. 7 is a flowchart illustrating example operations of the transportation management system 100 of FIG. 1 according to an embodiment. Although FIG. 7 is illustrated as a sequential, ordered listing of operations, it will be appreciated that some or all of the operations may occur in a different order, or in parallel, or iteratively, or may overlap in time.

Transportation parameters may be received (702). For example, the connection cache access engine 129 may be configured to receive the transportation parameters including a first location (starting location) and a second location (destination location).

A connection cache may be queried based on the transportation parameters (704). For example, the connection cache access engine 129 may be configured to query the transportation connection cache 128 based on the transportation parameters.

For example, the transportation connection cache 128 may include information that is necessary for determining the transportation network for transportation proposal, as opposed to the larger set of information contained in the databases 130. For example, upon creation of a transportation object (e.g., schedule, freight document, transportation lane, default route, etc.) within its respective database 130, the transportation connection cache 128 may be populated with connection-relevant transportation information associated with the created transportation object, which include only the details for determining possible connections without the other details such as the house bill of landing, for example. In other words, only the information from the transportation objects (schedules, freight bookings, freight orders, transportation lanes, default routes, etc.) that are relevant to determining connections may be populated into the transportation connection cache 128. As such, the transportation connection cache 128 may include transportation objects related to the schedules, freight bookings, freight orders, transportation lanes, default routes, however each of these transportation objects of the transportation connection cache 128 may include less information than the corresponding transportation objects in the databases 130.

One or more transportation objects may be selected from the connection cache that is relevant for the first location and the second location (706). For example, the connection cache access engine 129 may be configured to select one or more transportation objects related to the freight bookings, the schedules, the freight orders, the transportation lanes, and/or default routes from the transportation connection cache 128, that are relevant for the first location and the second location. In particular, the connection cache access engine 129 may select the appropriate schedules, freight documents, transportation lanes, and/or default routes from the transportation connection cache 128 that involve the first location and the second location.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A transportation management system for retrieving transportation information related to a shipment of goods using a transportation cache database without having to access and search multiple databases, the transportation management system comprising:
   one or more processors;
   a replication engine configured to replicate transportation information, describing one or more connections, from a plurality of databases and store the transportation information, describing the one or more connections, as transportation objects having only the transportation information, describing the one or more connections, in the transportation cache database, the transportation cache database including an in-memory database, wherein upon creation of a transportation object within one of the plurality of databases, the replication engine is configured to populate the transportation cache database with only the transportation information, describing the one or more connections, associated with the created transportation object, the plurality of databases storing schedules and freight documents for multiple modes of transportation, the schedules defining transportation capabilities of ocean, air, rail, and vehicle carriers, the freight documents including freight bookings and freight orders, the freight bookings including air-freight bookings and ocean-freight bookings, the freight orders including road-freight orders and rail-freight orders, the plurality of databases having separate access structures that permit access to respective transportation objects stored therein, the transportation cache database not storing details of the schedules and the freight documents that are not related to determining potential connections for the shipment of goods;

a connection cache access engine configured to receive transportation parameters including a first location and a second location, and query the transportation cache database via a single uniform interface using the transportation parameters to dynamically select transportation objects from the transportation cache database that are relevant for transporting the shipment of goods between the first location and the second location instead of independently accessing and searching the plurality of databases via the separate access structures;

a routing selector configured to select a transportation network including determining connections within the transportation network between the first location and the second location based on the transportation information, describing the one or more connections, in the transportation cache database;

a transportation proposal unit configured to determine transportation proposals based on the determined connections within the selected transportation network, each transportation proposal providing a different transportation plan for transporting the shipment of goods from the first location to the second location, the transportation proposals including a first transportation proposal for freight and ocean transportation, and a second transportation proposal for freight and air transportation; and a geo-map unit configured to display a map providing a visualization of the transportation proposals based on the determined connections from the routing selector, wherein the transportation proposals are provided via a transportation proposal user interface, the transportation proposal user interface defining a section that lists the transportation proposals and the determined connections, wherein a display of the first transportation proposal identifies the connections of different stages of the first transportation proposal, and the connections identify one or more of the freight documents.

2. The transportation management system of claim 1, wherein the transportation cache database stores a smaller set of information contained within the schedules and the freight documents than the schedules and the freight documents stored in the plurality of databases.

3. The transportation management system of claim 1, wherein the plurality of databases further stores transportation lanes, and the transportation cache database stores transportation information, describing one or more connections, for the transportation lanes, and the connection cache access engine is configured to select at least one transportation object from the transportation cache database related to at least one transportation lane that is relevant for transporting the shipment of goods between the first location and the second location.

4. The transportation management system of claim 1, wherein the plurality of databases further stores default routes, and the transportation cache database stores transportation information, describing one or more connections, for the default routes, and the connection cache access engine is configured to select at least one transportation object from the transportation cache database related to at least one default route that is relevant for transporting the shipment of goods between the first location and the second location, the at least one default route providing an existing defined route between the first location and the second location.

5. The transportation management system of claim 1, wherein the connections include at least one of a direct or multi-stop schedule, a freight booking, a freight order, a transportation lane, and a default route between the first location and the second location.

6. The transportation management system of claim 1, wherein the routing selector includes:
a transshipment location determination unit configured to determine a first explicitly assigned hub associated with the first location, and a second explicitly assigned hub associated with the second location,
wherein the routing selector is configured to select transportation objects for the transportation network using the first explicitly assigned hub and the second explicitly assigned hub as entries into the transportation cache database.

7. The transportation management system of claim 6, wherein the routing selector is configured to determine at least one implicitly assigned hub associated with the first location and at least one implicitly assigned hub associated with the second location based on an analysis of the transportation information, describing the one or more connections, of the transportation cache database.

8. The transportation management system of claim 7, wherein the routing selector further includes:
a path finder configured to create and verify available paths associated with the implicitly and explicitly assigned hubs, wherein the routing selector is configured to select the connections having verified paths.

9. The transportation management system of claim 1, wherein the map includes an explanation interface element that, when activated, provides further details regarding a determined connection.

10. The transportation management system of claim 1, wherein, when the transportation cache database is parameterized to return only schedule connections, the transportation proposal unit is configured to combine available schedules without considering the transportation information, describing one or more connections, of the freight documents.

11. A computer program product comprising a non-transitory computer-readable storage medium storing executable code thereon that, when executed, is configured to cause at least one processor to access a transportation cache database without having to access and search multiple databases, the executable code including instructions to cause the at least one processor to perform steps comprising:

replicate transportation information, describing one or more connections, from a plurality of databases storing schedules and freight documents for multiple modes of transportation, the schedules defining transportation capabilities of ocean, air, rail, and vehicle carriers, the freight documents including freight bookings and freight orders, the freight bookings including air-freight bookings and ocean-freight bookings, the freight orders including road-freight orders and rail-freight orders, wherein a freight document includes planned departure times of vehicles and a bill of lading, the plurality of databases having separate access structures that permit access to respective transportation objects stored therein, wherein the planned departure times of vehicles are replicated but not the bill of lading for storage within the transportation cache database;

store the transportation information, describing the one or more connections, as transportation objects having only the transportation information, describing the one or more connections, in the transportation cache database, the transportation cache database including an in-memory database, wherein upon creation of a transportation object within one of the plurality of databases, the transportation cache database is populated with only transportation information, describing the one or more connections, associated with the created transportation object, the transportation cache database not storing details of the schedules and the freight documents that are not related to determining potential connections for a shipment of goods;

receive transportation parameters including a first location and a second location;

query the transportation cache database via a single uniform interface using the transportation parameters instead of independently accessing and searching the plurality of databases via the separate access structures;

select a transportation network including determining connections within the transportation network for transporting the shipment of goods between the first location and the second location based on the transportation information, describing the one or more connections, in the transportation cache database;

determine transportation proposals based on the determined connections within the selected transportation network, each transportation proposal providing a different transportation plan for transporting the shipment of goods from the first location to the second location, the transportation proposals including a first transportation proposal for freight and ocean transportation, and a second transportation proposal for freight and air transportation; and display a map providing a visualization of the transportation proposals based on the determined connections.

12. The computer program product of claim 11, wherein the plurality of databases further stores transportation lanes, and the transportation cache database stores transportation information, describing one or more connections, for the transportation lanes, and instructions to select one or more transportation objects include selecting at least one transportation object from the transportation cache database related to at least one transportation lane that is relevant for transporting the shipment of goods between the first location and the second location.

13. The computer program product of claim 11, wherein the plurality of databases further stores default routes, and the transportation cache database stores transportation information, describing one or more connections, for the default routes, and the instructions include instructions to select at least one transportation object from the transportation cache database related to at least one default route that is relevant for transporting the shipment of goods between the first location and the second location, the at least one default route providing an existing defined route between the first location and the second location.

14. The computer program product of claim 11, wherein the connections include at least one of a direct or multi-stop schedule, a freight booking, a freight order, a transportation lane, and a default route between the first location and the second location.

15. The computer program product of claim 11, wherein the instructions include instructions to:
  determine a first explicitly assigned hub associated with the first location, and a second explicitly assigned hub associated with the second location; and
  select transportation objects for the transportation network using the first explicitly assigned hub and the second explicitly assigned hub as entries into the transportation cache database.

16. The computer program product of claim 15, wherein the instructions include instructions to:
  determine at least one implicitly assigned hub associated with the first location and at least one implicitly assigned hub associated with the second location based on an analysis of the transportation information, describing the one or more connections, of the transportation cache database.

17. A method for access to a transportation cache database without having to access and search multiple databases, the method comprising:
  replicating, by at least one processor, transportation information, describing one or more connections, from a plurality of separate databases storing schedules and freight documents for multiple modes of transportation, the schedules defining transportation capabilities of ocean, air, rail, and vehicle carriers, the freight documents including freight bookings and freight orders, the freight bookings including air-freight bookings and ocean-freight bookings, the freight orders including road-freight orders and rail-freight orders, the plurality of separate databases having separate access structures that permit access to respective transportation objects stored therein;
  storing, by the at least one processor, the transportation information, describing the one or more connections, as transportation objects having only the transportation information, describing the one or more connections, in the transportation cache database, the transportation cache database including an in-memory database, the transportation cache database not storing details of the schedules and the freight documents that are not related to determining potential connections for a shipment of goods;
  receiving, by the at least one processor, transportation parameters for the shipment of goods from a first location to a second location;
  selecting, by the at least one processor, a transportation network including determining connections within the transportation network for the first location and the second location based on the transportation information, describing the one or more connections, in the transportation cache database including querying the transportation cache database via a single uniform interface using the transportation parameters instead of independently accessing and searching the plurality of separate databases via the separate access structures;

determining, by the at least one processor, transportation proposals based on the determined connections within the selected transportation network, each transportation proposal providing a different transportation plan for transporting the shipment of goods from the first location to the second location, the transportation proposals including a first transportation proposal for freight and ocean transportation, and a second transportation proposal for freight and air transportation; and displaying a map providing a visualization of the transportation proposals based on the determined connections, wherein the transportation proposals are provided via a transportation proposal user interface, the transportation proposal user interface defining a section that lists the transportation proposals and the determined connections, wherein a display of the first transportation proposal identifies the connections of different stages of the first transportation proposal, and the connections identify one or more of the freight documents.

18. The method of claim 17, wherein the connections include at least one of a direct or multi-stop schedule, a freight booking order, a freight order, a transportation lane, and a default route.

19. The method of claim 17, wherein the selecting, by the at least one processor, a transportation network including determining connections within the transportation network for the first location and the second location based on the transportation information, describing the one or more connections, in the transportation cache database further includes:

determining a first explicitly assigned hub associated with the first location, and a second explicitly assigned hub associated with the second location; and selecting transportation objects for the transportation network using the first explicitly assigned hub and the second explicitly assigned hub as entries into the transportation cache database.

* * * * *